United States Patent [19]

Heard

[11] Patent Number: 4,716,679
[45] Date of Patent: Jan. 5, 1988

[54] PRE-GROWN LAWN TURF PRODUCT AND METHOD OF GROWING

[76] Inventor: Richard A. Heard, 2330 Dairy Loop Rd., Roseburg, Oreg. 97470

[21] Appl. No.: 82,952

[22] Filed: Aug. 4, 1987

Related U.S. Application Data

[63] Continuation of Ser. No. 906,628, Sep. 10, 1986, abandoned, which is a continuation of Ser. No. 691,222, Jan. 14, 1985, abandoned.

[51] Int. Cl.⁴ .............................................. A01C 1/04
[52] U.S. Cl. .............................................. 47/56; 47/9
[58] Field of Search .................... 47/56, 9; 111/1; 71/23–25

[56] References Cited

U.S. PATENT DOCUMENTS

| | | | |
|---|---|---|---|
| 776,139 | 11/1904 | Luebben | 47/56 X |
| 1,978,102 | 10/1934 | Clapp | 47/56 X |
| 2,192,939 | 3/1940 | Slayter et al. | 47/56 X |
| 2,605,589 | 8/1952 | Kuestner | 47/56 |
| 2,733,838 | 2/1956 | Neff | 111/1 X |
| 2,876,588 | 3/1959 | Tietz et al. | 47/58 |
| 2,923,093 | 2/1960 | Allen | 47/56 |
| 3,080,681 | 3/1963 | Merrill et al. | 47/56 |
| 3,139,701 | 7/1964 | Nishuchi | 47/58 |
| 3,172,234 | 3/1965 | Eavis | 47/1.2 |
| 3,541,979 | 11/1970 | Lorenzen | 111/2 |
| 3,845,584 | 11/1974 | Mercer | 47/56 |
| 3,863,388 | 2/1975 | Loads | 47/56 |
| 3,867,250 | 2/1975 | Jankowiak et al. | 47/9 X |
| 3,890,739 | 6/1975 | Blackburn | 47/56 |
| 3,903,816 | 9/1975 | Brem | 47/56 X |
| 3,914,901 | 10/1975 | Muldner | 47/56 |
| 3,940,257 | 2/1976 | Sherwin et al. | 71/23 |
| 4,063,384 | 12/1977 | Warren et al. | 47/56 X |
| 4,063,385 | 12/1977 | Friedberg | 47/56 X |
| 4,066,490 | 1/1978 | Yoshimi | 156/276 |
| 4,067,716 | 1/1978 | Sterrett | 47/9 X |
| 4,099,345 | 7/1978 | Loads | 111/1 X |
| 4,154,174 | 5/1979 | Rees, Jr. et al. | 111/1 |
| 4,232,481 | 11/1980 | Chamoulaud | 111/1 X |
| 4,283,880 | 8/1981 | Fjeldsa | 47/9 X |
| 4,297,810 | 11/1981 | Hansford | 111/1 X |
| 4,309,844 | 1/1982 | King et al. | 47/56 |
| 4,336,668 | 6/1982 | Decker | 47/58 |
| 4,357,780 | 11/1982 | Ball | 47/56 |
| 4,364,197 | 12/1982 | Baron | 47/56 |
| 4,369,597 | 1/1983 | Leep et al. | 47/9 |
| 4,414,776 | 11/1983 | Ball | 47/56 |
| 4,424,645 | 1/1984 | Rannali | 47/66 |

FOREIGN PATENT DOCUMENTS

| | | | |
|---|---|---|---|
| 1126663 | 3/1962 | Fed. Rep. of Germany . | |
| 1582123 | 7/1977 | Fed. Rep. of Germany | 47/56 |
| 2208598 | 6/1974 | France . | |
| 41204 | 9/1982 | Japan | 47/56 |
| 1290338 | 9/1972 | United Kingdom . | |

OTHER PUBLICATIONS

Modern Potting Composts, a manual on the preparation and use of growing media for pot plants, A. C. Bunt.

Primary Examiner—Robert A. Hafer
Assistant Examiner—Danton D. DeMille
Attorney, Agent, or Firm—Eugene M. Eckelman

[57] ABSTRACT

A base layer of straw is deposited on an impervious surface and grass seed, either dry or in a slurry, is deposited on such base layer. In one embodiment, comminuted straw particles are included in a slurry of grass seed and water to form a top layer on the base layer. The base layer of straw may comprise loose or pelletized straw and apparatus forming a part of the invention may be employed which has elements for laying an impervious plastic sheeting and for dispensing pelletized straw on the plastic sheeting and for dispensing grass seed on the straw, all in one pass of the apparatus.

4 Claims, 7 Drawing Figures

PRE-GROWN LAWN TURF PRODUCT AND METHOD OF GROWING

This application is a continuation of application Ser. No. 906,628, filed 9/10/86, now abandoned which in turn is a continuation of application Ser. No. 699,222, filed 1/14/85, now abandoned.

BACKGROUND OF THE INVENTION

This invention relates to a new and useful lawn turf product capable of being transplanted to a permanent site, and to a method of growing the same. The invention also includes a new and useful apparatus for planting the product.

It has heretofore been known to grow lawn turf on an impervious surface such as concrete or plastic sheeting. This system eliminates the problem of weeds growing up through the ground and furthermore provides a turf that can readily be lifted for transplanting to a permanent site. Concepts heretofore employed along this line utilize a layer of barkdust on the impervious surface, and grass seed is combined with the barkdust for germination. It has been found that barkdust has inherent disadvantages, one of which comprises the fact that it is very expensive to purchase. Another disadvantage of barkdust is that it must be nitrated up to one year in advance before planting.

SUMMARY OF THE INVENTION

According to the present invention and forming a primary objective thereof, a lawn turf product and method of growing the same are provided which amount to a substantial improvement over the existing product and method. It is also an object of the invention to provide an apparatus for planting the lawn turf product.

In carrying out the invention, the product and method utilize a base layer of loose or pelletized straw which amounts to a substantial improvement over barkdust when deposited on an impervious surface to form the growing area for grass seed when deposited thereon. The invention also includes the concept of mixing a slurry of grass seed and water with comminuted straw for producing a top layer on the base layer. Also, the invention includes a novel apparatus capable of laying all the elements of a row of sod in one pass.

The invention will be better understood and additional objects and advantages will become apparent from the following description taken in connection with the accompanying drawings.

BRIEF DESCRIPTION OF THE DRAWINGS

With reference to FIGS. 1-5, a first embodiment of the invention is illustrated. The numeral 10 designates a supporting surface such as earth and the numeral 12 designates an impervious surface comprising plastic sheeting. After applying the sheeting 12 to the supporting surface, the first step of the invention comprises depositing a base layer 14 of straw of suitable thickness capable of germinating seed and also capable of forming a base for plant growth including some root length. Although the thickness of the base layer can vary, a thickness in the range of about ¾ inch to 1¼ inch will suffice. Such base layer can readily be applied to the surface 12 by conventional methods. For example, this layer may comprise loose straw in which event it may be applied by spreading or blowing equipment. Such layer may also comprise pelletized straw in which case spreading or dumping equipment may be used. The use of pellets has an important advantage in that it can be readily applied in a uniform thickness layer and the layer will generally maintain a uniform thickness as the sod matures.

Grass seed 16 is then deposited on the base layer 14. This may be accomplished in a slurry by a suitable conventional hydro-seeder 18 or it may merely be spread on dry. The seed settles into the base layer and germinates with proper moisture application and control, if necessary, into a turf structure 20. The numeral 22 in FIG. 4 designates top growth and the numeral 24 designates root growth. The roots of the grass which extend through the turf will bunch up into a thick mat against the impervious surface but will almost instantly straighten out and penetrate the ground once the turf has been transplanted. As seen in FIG. 5, the turf can readily be rolled up as needed, the matted roots 24 being freely rolled with the turf and not being severed as occurs in earth grown turf.

This allows pre-grown turf to be harvested and transplanted at a much earlier rate.

Figure 1:
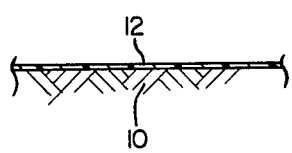
FIG. 1 is a fragmentary sectional view showing one form of impervious support surface on which the turf is grown, namely, a plastic sheeting supported on a ground surface.
Figure 2:
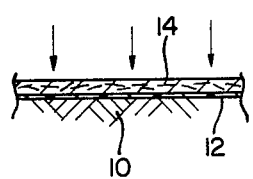
FIG. 2 illustrates a first step of the method wherein a base layer of straw is deposited on the impervious surface.
Figure 3:
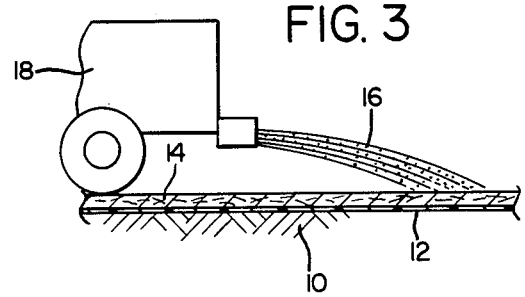
FIG. 3 illustrates a further step of the method, comprising depositing a slurry of water and grass seed on the base layer.
Figure 4:
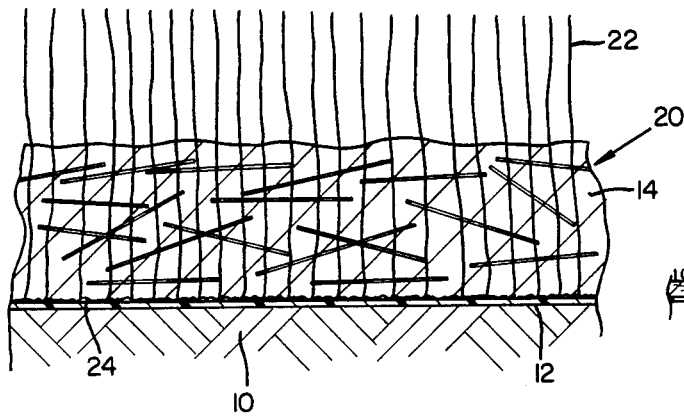
FIG. 4 is an enlarged fragmentary sectional view taken through mature turf grown according to FIGS. 1-3 and ready to be transplanted.
Figure 5:
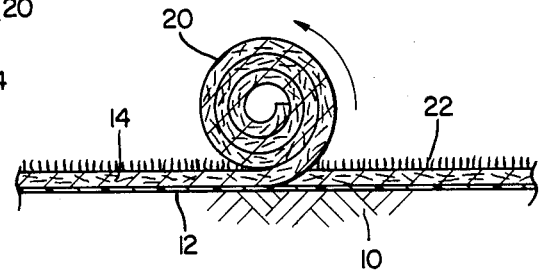
FIG. 5 illustrates a manner of taking up the turf for transplanting.
Figure 6:
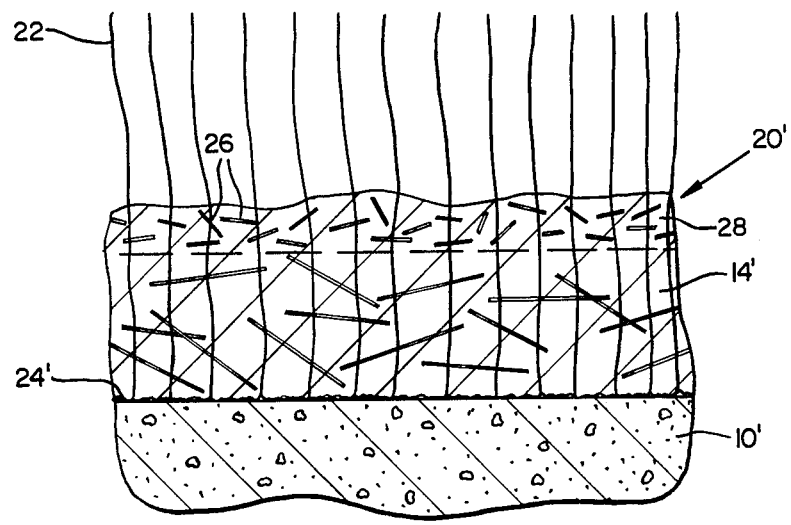
FIG. 6 is a fragmentary sectional view showing a second embodiment of the invention, this embodiment illustrating the impervious surface as comprising concrete.

In the embodiment of FIG. 6, the turf structure 20' is illustrated as being grown on a concrete surface 10'. Such surface serves the same purpose as the plastic sheeting 12, namely, it comprises an impervious surface and one which the roots of the turf do not penetrate. Other surfaces, such as asphalt can also be used. In this embodiment, a base layer 14' is utilized the same as base layer 14 in the first embodiment. However, in this second embodiment, the seed is applied by first mixing it with comminuted straw 26, thus forming a top layer 28 on the base layer 14'. Layer 28 may be blown in place in a dry mixture of the straw and seed or it may also be deposited in a water slurry. The layer 28 may assume various thicknesses but a preferred thickness is in the range of from about ⅛ inch to about ½ inch. Alternatively, the seed can be blown on with the first application of straw, namely, with the layer 14', rather than with the top layer 28.

Figure 7:
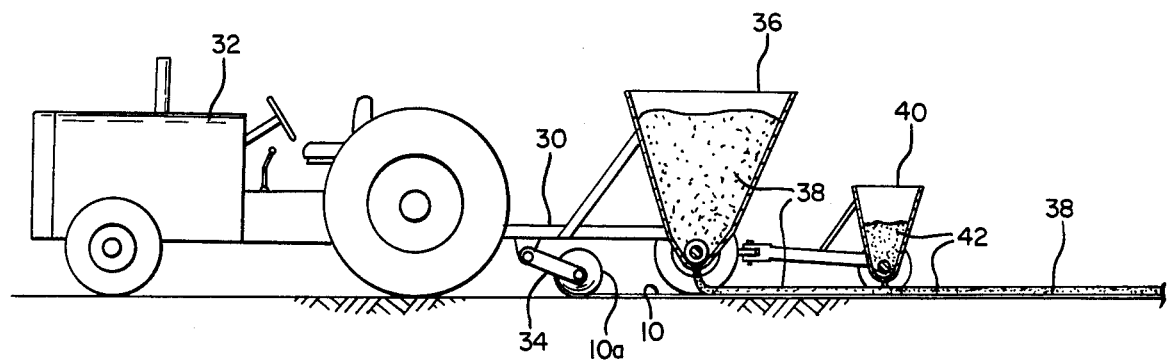
FIG. 7 is a side elevational view, mostly diagrammatic, of apparatus for planting the product.

The following examples illustrate various method means and constructions of the invention:

With reference to FIG. 7, apparatus is shown for planting the present product when pelletized straw is used. Such apparatus comprises a draw frame 30 for hitching to a tractor 32 or other pulling vehicle. Connected to draw frame 30 is a free hanging bail 34 for dispensing a plastic layer 10 from a roll of plastic sheeting 10a. Connected to the draw frame behind the bail 34 is a wheel supported dispenser 36 for pelletized straw 38, and connected behind the dispenser 36 is a wheel supported dispenser 40 for grass seed 42. The three elements 10, 36 and 40 are of common width and cooperate to lay all the elements of a row of sod in one pass.

EXAMPLE I

Straw was deposited as it comes from the field in a first or base layer of about ¾ inch to about 1¼ inch in thickness or depth on an impervious surface and then a slurry of water and grass seed was deposited on the base layer. Suitable moisture control was maintained to accomplish germination and growth.

Straw in all the Examples can be substantially any type of straw such as grass or cereal straw. Grass straw, however, such as bluegrass, fescue, or the like, which is grown for lawn turf, is extremely inexpensive and is free of weeds.

EXAMPLE II

Straw was deposited in a first or base layer of suitable thickness to form a turf on an impervious surface and then a top layer of a mixture of comminuted straw and grass seed was deposited on the base layer. Suitable moisture content was maintained to accomplish germination and growth.

EXAMPLE III

Straw was deposited in a first or base layer of suitable thickness on an impervious surface and then a slurry comprising water, grass seed, and comminuted straw was deposited on the base layer, the straw in the top layer being comminuted to a length ranging between about ¼ inch and about ¾ inch. The top layer ranged in thickness or depth between about ⅛th inch and about ½ inch.

In this last Example, the layer 26 provides a crust on the base layer 14 and induces fast germination. While this top layer holds moisture in, it allows ultraviolet light to reach the seeds for good germination.

EXAMPLE IV

The steps of this example are the same as Example I with the exception that the base layer of straw comprised pelletized straw rather than loose straw. The grass seed was sown on the base layer in dry form and then a fine mist of moisture was applied to produce germination.

According to the present invention, a high quality lawn turf is provided but one which is of considerable less cost than turf heretofore grown. Decomposition of the straw also provides a good mulch for the turf.

It is to be understood that the forms of my invention herein shown and described are to be taken as preferred examples of the same and that various changes in the method and construction may be resorted to without departing from the spirit of my invention, or the scope of the subjoined claims.

Having thus described my invention, I claim:

1. A pre-grown lawn turf capable of being transplanted to a permanent site and consisting essentially of
    a layer of straw having an upper portion and being at least ¾ inch thick on a water and root impervious surface to form a growing base for turf on said impervious surface, and
    germinated grass seed which in the formation of the turf was distributed on said upper portion of the straw layer in a slurry of water and which when grown has its roots extending downward through the thickness of the straw layer and bunched up into a mat against the impervious surface, forming an integrated turf capable of being lifted off said impervious surface and transplanted at a permanent site.

2. The lawn turf of claim 1 wherein said slurry of water includes comminuted straw about ⅛ inch to ½ inch thick.

3. The method of producing pre-grown lawn turf capable of being transplanted to a permanent site, comprising
    depositing on a water and root impervious surface a base layer of dry straw at least ¾ inch thick,
    distributing a germination layer of water and grass seed over the upper surface of the straw layer,
    and maintaining the seed and straw layer moist during germination of the grass seed to cause extension of the roots downward through the thickness of the straw layer until the roots bunch up into a mat against the impervious surface and form an integrated turf capable of being lifted off said impervious surface and transplanted at a permanent site.

4. The method of claim 3 wherein the step of distributing said germination layer includes, comminuted straw, said germination layer being laid to a thickness of ⅛ inch to ½ inch.

* * * * *